J. H. H. VOSS.
AUTOMATIC RING PLATE VALVE.
APPLICATION FILED JAN. 16, 1919.
1,343,534.
Patented June 15, 1920.
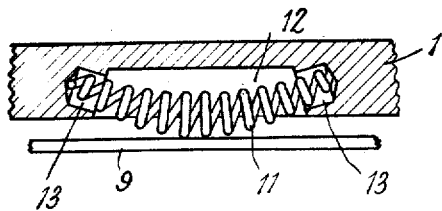
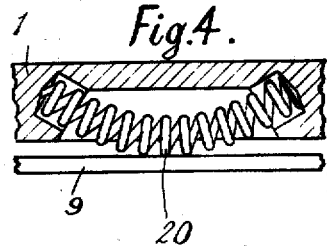
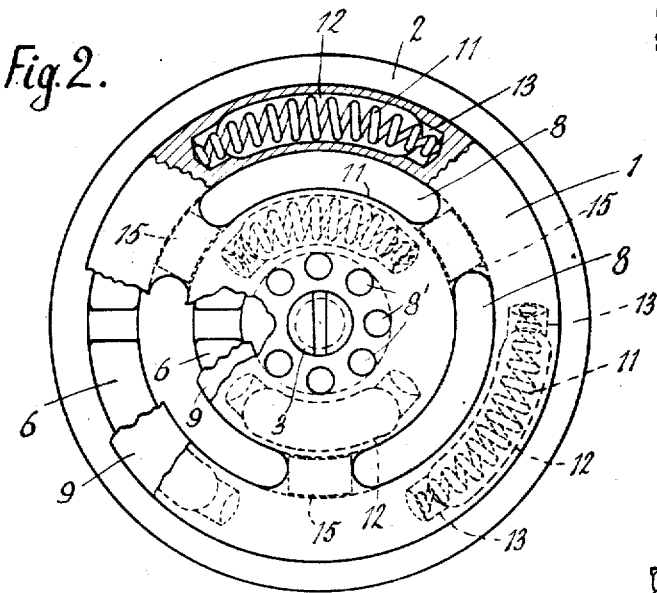
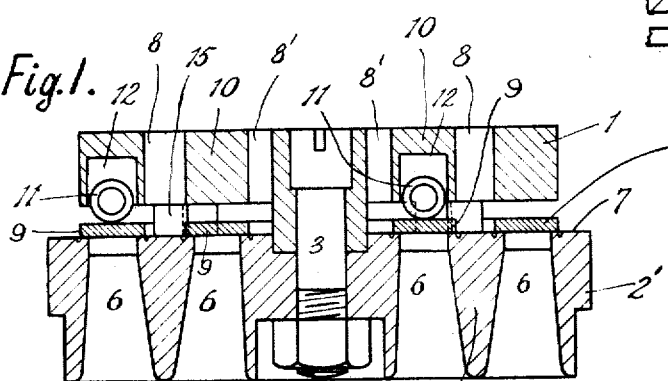
Inventor
Johann Heinrich Hermann Voss,
by
William Richards
Attorney

UNITED STATES PATENT OFFICE.

JOHANN HEINRICH HERMANN VOSS, OF MOUNT VERNON, NEW YORK.

AUTOMATIC RING-PLATE VALVE.

1,343,534.

Specification of Letters Patent.  Patented June 15, 1920.

Application filed January 14, 1919. Serial No. 271,360.

*To all whom it may concern:*

Be it known that I, JOHANN HEINRICH HERMANN VOSS, a citizen of Germany, residing at Mount Vernon, Westchester county, State of New York, have invented certain new and useful Improvements in Automatic Ring-Plate Valves, of which the following is a specification.

This invention relates to automatic ring plate valves for use in high speed gas and air compressors and the like, and is an improvement over existing valves of this class in the respect that it combines in one structure, the following principal features, to wit, the valve plate and its seating spring are unrestrained and wholly free from localized bending and hence from the crystallization of the metal and early fracture which results therefrom.

The housing of the valve ring plate and its seating spring is so designed that that portion of the housing called the cap will be of a comparatively low height, while the spring located therein is of large mass and great flexibility and is preferably a spiral or coiled spring arranged in arcshape position and embedded in trenchlike grooves with recesses at each end. The springs are inserted into the recesses by being compressed and released after insertion so that the ends are unmovable when in operating position and only the center-part of the arc-shaped coiled spring projects from the embedding groove to engage the ringplate.

A further object is to secure the ends of the springs so that they cannot interfere with the full lift of the valve by working between the cap seat and ring plate and so that the springs cannot leave their embedding grooves and recesses even when they break.

And finally, the valve housing is designed to be made by the simplest machining processes—turning, grinding and drilling, and hence can be produced at low cost.

The preferred form of my invention, the same being a valve structure possessing the combination of all of the aforesaid important features, is shown in the accompanying drawings, wherein:

Figure 1 is an axial sectional view of an assembled valve;

Fig. 2 is a plan view partly broken away thereof;

Figs. 3, 4 and 5 are detailed sectional views showing different types of springs.

The valve ring plate as here shown consists of two sections 1 and 2, of circular shape provided with a central countersunk bolt-hole adapted to receive a bolt 3 by which they may be clamped together, with the valve ring plates and their springs housed between them, and having appropriate external surfaces or shoulders 2' whereby the assembled parts may be clamped in the compressor structure.

Both valve sections are, or may be, simple castings, the section marked 2 forming the valve seat, and the other being the cap which retains the valve plates in position and provides also the embedding grooves and recesses forming the backing or abutment for the springs thereof.

For a multiported valve of the kind here shown, the seating part 2 is cast with port slots 6 of arcuate form arranged in two concentric series suited to the circular contour of the structure. The upper or inner ends of all these port slots terminate at a common seat surface 7 which surface is a plane and hence easily produced in its finished form by ordinary tools. A pair of concentric valve ring plates 9 are seated on this surface above the slots 6.

The cap section 1 is formed with flow slots 8 and apertures 8' in similar, parallel arrangement to the port slots 6, but offset relatively thereto, so as to cause the wall portions 10, between and at the side of said flow slots, to be disposed directly opposite to or over the port slots.

These portions of the cap section thus opposed to the port slots carry the springs 11 which hold the valve plates on their seat, being formed to accommodate the springs with arcuate trenchlike grooves 12 therein, at whose opposite ends are recesses 13 in which the ends of the springs engage, the springs being compressed and bowed downwardly, as shown, when in position.

The springs are shown in Figs. 2 and 3 as diminishing in size from the center toward the ends. The springs 11 may be spiral springs of well tempered steel. Being unattached to any part but having their ends unmovably secured and having only a small fraction of their volume projecting from their embedding grooves and recesses, these springs yield by bending uniformly throughout their entire length and not locally, these qualities being essential in any form of seating spring within this invention.

The valve plates are retained against lateral, or sliding displacement by lugs 15 formed on the underside of the cap section 1 and which act also as spacing members for the two sections.

With this arrangement a light and strong construction is provided, and one in which there will be a minimum of wear on the parts due to rubbing action. The flow of gas past and around the ends and edges of the valve plates passes through the holes 8' as well as through the flow slots 8. It will be understood that various changes, substitutions, and modifications may be made in size and arrangement of the parts without departing from the invention as specified in the following claims.

In Fig. 4 I have shown a type of spring, 20, differing from the spring 11 in that it does not taper toward the end; while in Fig. 5 I have shown a spring made up of a one-piece flat ribbon spirally wound to form the spring ends 21 and 22.

What I claim as new and desire to secure by Letters Patent is:—

1. A valve of the type described, comprising, a seating section and a cap section secured together with a space between their adjacent faces, arcuate ports formed in each section, the ports in one section being offset relatively to those of the other section, a valve plate closing the ports in the seating section, trenchlike, arcuate grooves with adjacent recesses formed in the cap section and serving to bow spirally coiled springs to engage said valve plates and keep the ends of the springs from interfering with the full lift of the said valve plates.

2. A valve of the type described, comprising a seating section and a cap section secured together with a space between their adjacent faces, arcuate ports formed in each section and arranged in concentric relation, the ports in one section being offset radially from those in the other section, concentrically arranged valve plates closing the ports in the seating section, trenchlike, areshape grooves with adjacent recesses formed in the wall section of said cap section serving to embed spirally coiled springs compressed between the abutment surfaces of the said recesses, the ends of the springs being held immovable when in operating position to prevent them from interfering with the full play of the valve plates.

3. In a valve of the type specified, a cap section and a seating section spaced apart, a port in said seating section, a valve disposed between said sections closing said port, and a spiral spring nested at its ends in said cap section and bowed outwardly to engage said valve to retain it on its seat.

4. In a valve of the type described, a cap section and a seating section, the cap section having a central boss and a series of radially disposed bosses whereby the sections are spaced apart, a bolt passing through the central boss and through the seating section whereby the two sections are secured together, ports formed in each of the sections, annular valve plates localized by the said radially disposed bosses covering the ports in the seating section and spiral springs nested at their ends in said cap section.

5. In a valve of the type specified, a cap section and a seating section, arcuate ports formed in each section and arranged in concentric relation, the ports in one section being offset radially from those in the other section, a pair of concentrically arranged valve plates covering the ports in the seating section, and a series of spiral springs engaging each of said valve plates to hold them in position, said springs being carried in arcuate grooves in the cap section whereby they are curved to contact with the valve plate.

6. In a valve of the type specified, a seating section and a cap section of circular shape, arcuate ports in each section, a valve plate concentric to the seating section covering the ports in the latter, trenchlike grooves with adjacent recesses formed in the cap section and serving to bow the spirally coiled volute springs to centrally engage said valve plate and keep the ends of the springs from interfering with the full lift of the said valve plates.

7. In a valve of the type described, a cap section and a seating section spaced apart, valve ring plates held between said sections, trenchlike grooves formed in said cap section, and springs the ends of which are held in recesses at the ends of said grooves, said springs engaging said valve plates between their ends.

8. In a valve of the type described, a cap section and a seating section spaced apart, valve ring plates held between said sections, trenchlike grooves formed in said cap section, and springs the ends of which are unattached and loosely held in recesses at the ends of said grooves, said springs engaging said valve plates between their ends.

9. In a valve of the type described, a cap section and a seating section spaced apart, valve ring plates held between said sections, trenchlike grooves formed in said cap section, and springs the ends of which are unattached and loosely held in recesses at the ends of said grooves, said springs engaging said valve plates between their ends, the whole being so arranged that the springs cannot leave said grooves and recesses even in case of said springs being broken in use.

10. In a valve of the type described, a cap section and a seating section spaced apart, valve ring plates held between said sections, trenchlike grooves formed in said cap section, and coiled springs arranged in said grooves to bear on said plates in a direction transverse to their length, whereby the clearance space may be reduced by lessening the height of the cap section.

In testmony whereof I have signed my name to this specification this 3rd day of January, 1919.

JOHANN HEINRICH HERMANN VOSS.